United States Patent [19]

Osborne

[11] 4,101,887

[45] Jul. 18, 1978

[54] MONITORED FIRE PROTECTION SYSTEM

[75] Inventor: William B. Osborne, Marlboro, Mass.

[73] Assignee: Walter Kidde and Co., Inc., Clifton, N.J.

[21] Appl. No.: 726,209

[22] Filed: Sep. 24, 1976

[51] Int. Cl.[2] .............. G05B 23/00

[52] U.S. Cl. .............. 340/652; 169/60; 340/540; 169/61

[58] Field of Search .............. 340/418, 416, 409, 256; 169/61, 60

[56] References Cited

U.S. PATENT DOCUMENTS

| | | | |
|---|---|---|---|
| 3,562,730 | 2/1971 | Hill et al. | 340/214 |
| 3,641,547 | 2/1972 | Reiss et al. | 340/256 |
| 3,786,501 | 1/1974 | Marnerakis | 340/409 |
| 3,797,008 | 3/1974 | Yuasa | 340/409 |
| 3,886,932 | 6/1975 | Suessmilch | 317/22 X |
| 3,952,809 | 4/1976 | Osborne | 340/418 |

*Primary Examiner*—John W. Caldwell, Sr.
*Assistant Examiner*—Donnie L. Crosland
*Attorney, Agent, or Firm*—John E. Toupal

[57] ABSTRACT

An electrical fire protection system including a plurality of extinguishant filled suppressor units activatable by explosive squibs connected in series. In response to the detection of an abnormal condition associated with fires, a control circuit initiates an activating current flow that detonates the explosive squibs and induces release of the extinguishant from the suppressor units. A supervisory current supply establishes through the series connected squibs, a constant level of supervisory current flow that is insufficient to induce detonation of the squibs but establishes a detectable voltage drop thereacross. In response to the detection of an abnormally high voltage level across the series connected squibs, a switching circuit switches the squibs from a series to a parallel circuit relationship.

15 Claims, 2 Drawing Figures

MONITORED FIRE PROTECTION SYSTEM

BACKGROUND OF THE INVENTION

This invention relates generally to fire protection systems and, more particularly, to fire protection systems in which a plurality of individual fire suppressor units are simultaneously activated to extinguish a fire.

Certain fire protection systems employ a plurality of strategically located suppressor units, each including an extenguishant filled vessel and an electrical current operated explosive squib for inducing discharge of the extinguishant in response to detection of a fire. Normally the squibs are connected in a series string since a higher power density at each squib can be achieved in a series connection, than can be achieved in a parallel connection. In such systems, it is common technique to electrically supervise the electric integrity of the release squibs by providing and monitoring a trickle current through the series connection thereof. Although this series supervision establishes a constant knowledge of release mechanism integrity, there remains the possibility that a single release member failure will cause failure of the entire series system. In addition, even a detected failure of a release mechanism can prevent system operation if the detected failure occurs coincidentally with a demand for system actuation. Also, a fast-acting squib may cut off the current before a slower acting squib has had a chance to activate.

Solution to this problem is provided in U.S. Pat. Nos. 3,917,001 and 3,952,809. The systems disclosed in these patents include a circuit for switching the release squibs from a series to a parallel arrangement a short period after system activation is initiated. Although a substantial improvement over the prior art, the disclosed systems fail to detect and act on a fault condition prior to the detection of a fire condition.

The object of this invention, therefore, is to provide a more reliable fire protection system of the type employing a plurality of individual suppressant units all having electrically operated release mechanisms adapted for coincident activation.

SUMMARY OF THE INVENTION

The invention is an electrical fire protection system including a plurality of extinguishant filled suppressor units activatable by explosive squibs connected in series. In response to the detection of an abnormal condition associated with fires, a control circuit initiates an activating current flow that detonates the explosive squibs and induces release of the extinguishant from the suppressor units. A supervisory current supply establishes through the series connected squibs, a constant level of supervisory current flow that is insufficient to induce detonation of the squibs but establishes a detectable voltage drop thereacross. In response to the detection of an abnormally high voltage level across the series connected squibs, a switching circuit switches the squibs from a series to a parallel circuit relationship. By switching into a parallel mode, activation of the individual squibs pursuant to detection of a fire condition is insured despite the existence of the detected fault that would have rendered series activation improbable.

In accordance with one feature of the invention, the system is also provided with a maximum voltage detector that senses a substantially open circuit across the series connected activators and in response thereto disables the control circuit to prevent the initiation of activating current flow through the series connected squibs. This action prevents the application of a potentially dangerous voltage across the detected open circuit which would normally be located in a fire or explosion hazardous environment.

Another feature of the invention is the provision of a minimum voltage detector for sensing a substantially short circuit across the series connected squibs and a danger voltage detector for sensing a voltage thereacross less than a value which would prevent series activation of squibs but which nonetheless is higher than normal. A logic circuit responds to signals from both the minimum voltage detector and the danger voltage detector in addition to the maximum and fault voltage detectors and controls a remote display at which overall system integrity can be monitored.

These and other features and objects of the invention will become more apparent upon a perusal of the following description taken in conjunction with the accompanying drawings wherein:

FIG. 1 is a schematic block diagram illustrating an electrical protection system according to the invention; and FIG. 2 is a schematic block diagram illustrating further details of the extinguishing network shown in FIG. 1.

DESCRIPTION OF THE PREFERRED EMBODIMENT

Figure 1:
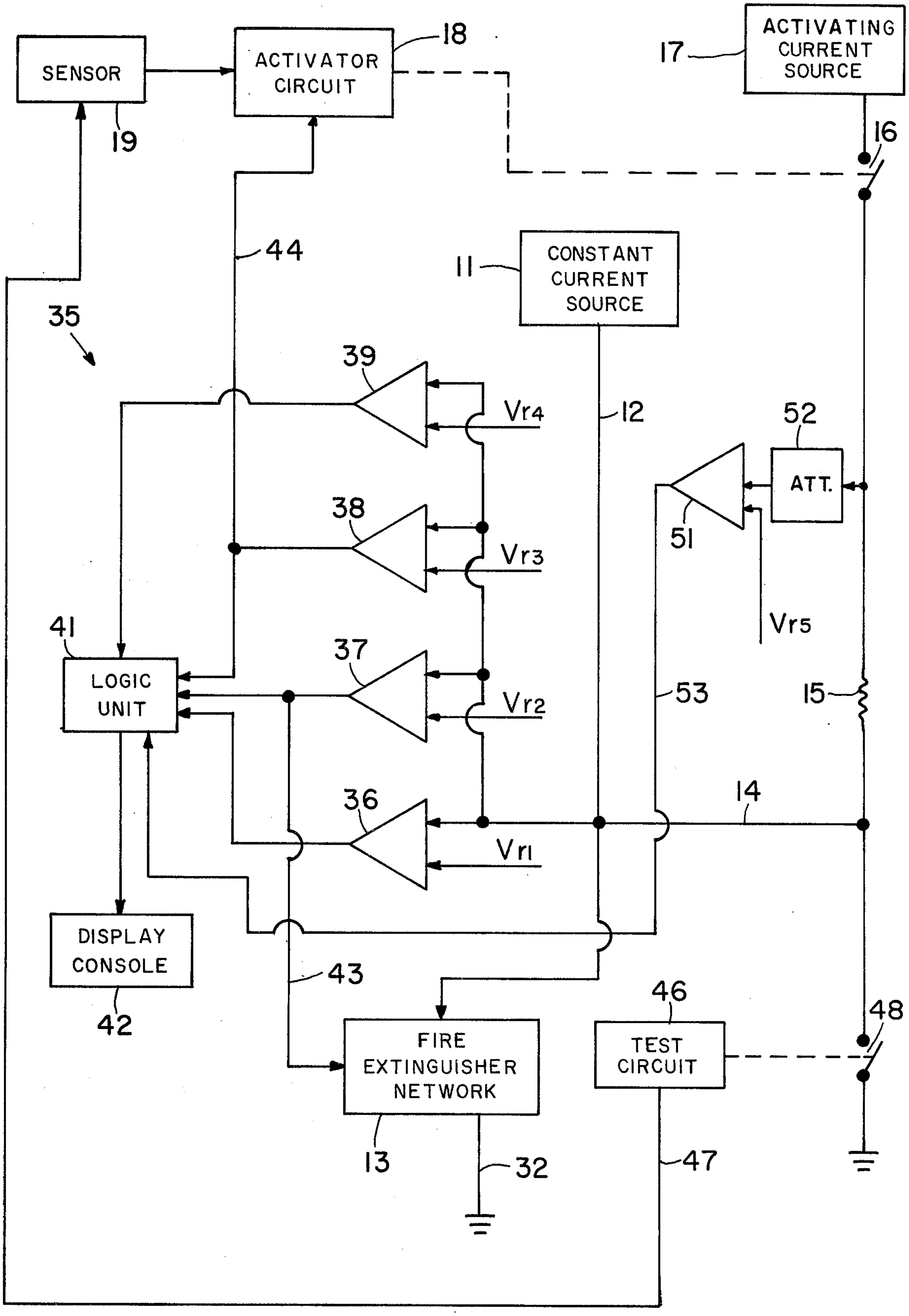

Referring now to FIG. 1, a constant current source 11 is connected by a line 12 to a fire extinguishing network 13 described in greater detail below. Also connected to the network 13 by a line 14, a resistor 15 and a pair of normally open contacts 16 is an activating current source 17. The contacts 16 are controlled by an activator circuit 18 that in turn responds to a condition responsive sensor 19. Suitable condition responsive sensors include, for example, thermal switches such as those disclosed in U.S. Pat. Nos. 2,537,028 and 3,423,585.

Figure 2:
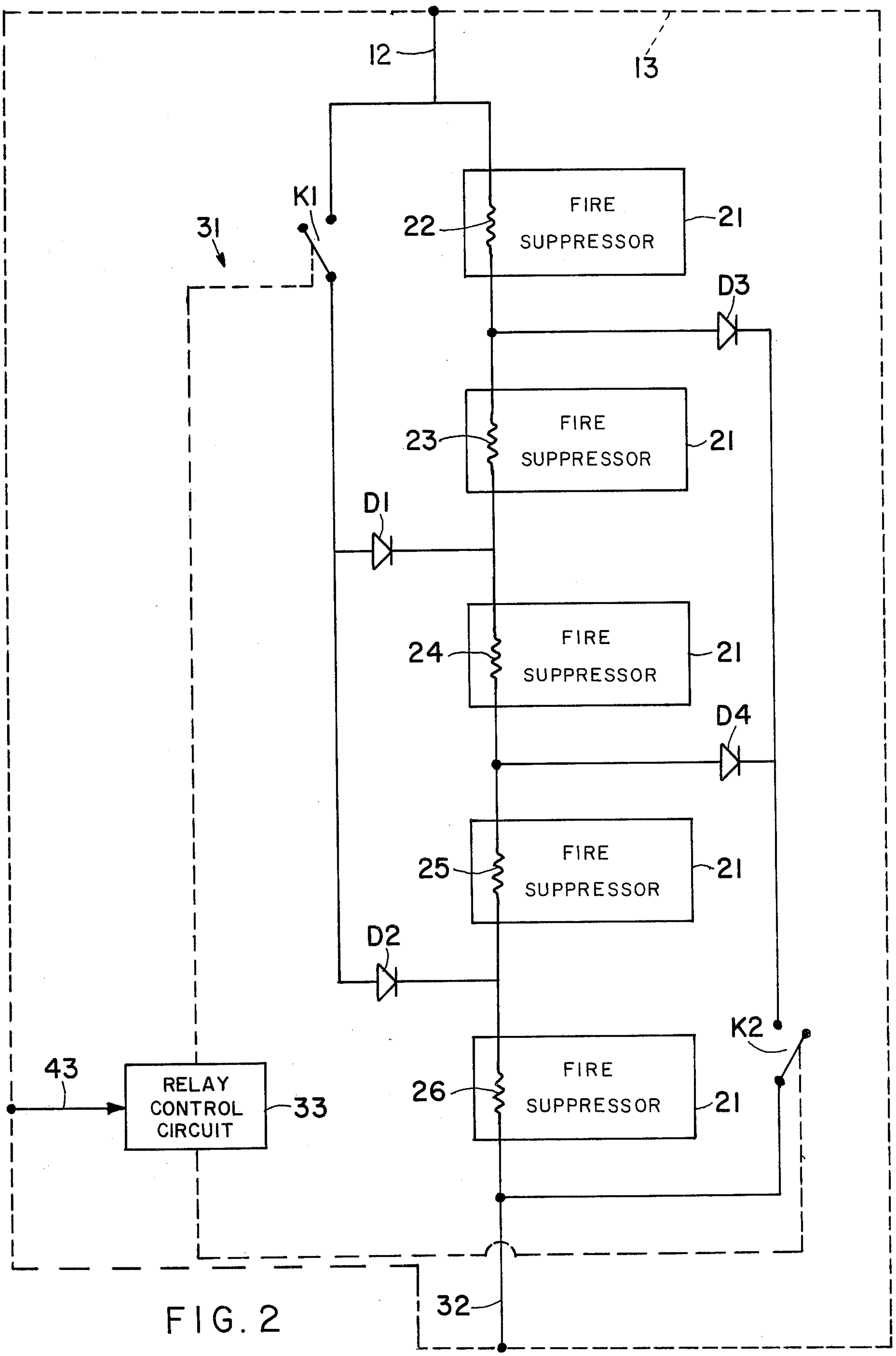

As shown in FIG. 2, the fire extinguishing network 13 includes a plurality of vessels 21 filled with a suitable fire extinguishing agent and distributed strategically throughout a fire protected zone. Associated with each of the vessels 21 is an explosive squib 22, 23, 24, 25, and 26 that is detonated by electrical current flow to induce release of the agent contained. The vessels 21 and the activators 22 - 26 are conventional and of the type, for example, disclosed in U.S. Pat. Nos. 2,693,240 and 3,523,583. A series to parallel switching circuit 31 includes a first set of diodes D1 and D2 connected by a pair of normally open relay contacts K1 to the input line 12. Each of the diodes D1 and D2 also is connected to a different alternate junction between the activators 22 - 26. Also included in the switching circuit 31 is a second set of diodes D3 and D4 connected by a pair of normally open contacts K2 between one of the other alternate junctions between the activators 22 - 26 and a grounded lead 32. Mechanically coupled to the contacts K1 and K2 is a relay control circuit 33.

During normal operation, a supervisory current of, for example, about 5 - 10 milliamps is fed through the series connected activator squibs 22 - 26 by the constant current source 11. This supervisory current flow establishes a voltage drop of about 5 - 10 millivolts across each of the squibs 22 - 26 of the series string. As described hereinafter the total drop across the series activator string present on line 12 is monitored to determine the integrity of the overall system.

Upon detection of a fire condition, the sensor 19 causes the activator circuit 18 to close the contacts 16 and thereby initiate activating current flow from the current source 17 to the series connected activator squibs 22 – 26. This activating current flow detonates the squibs 22 – 26 inducing coincidental release of the extinguishant contained by each of the vessels 21. Consequently, any fire existing in the protected zone occupied by the vessels is extinguished.

The integrity of the fire extinguishing network 13 is continuously supervised by a supervisory circuit 35 (FIG. 1) that continuously monitors the voltage level on the input line 12. Included in the network 35 is a danger voltage detecting operational amplifier 36 having one input connected to the input line 12 and a second input connected to a reference voltage Vr1 of, for example, 100 millivolts; a fault voltage detecting operational amplifier 37 having one input connected to the line 12 and a second input connected to a reference voltage Vr2 of, for example, 250 millivolts; a maximum voltage responsive operational amplifier 38 having one input connected to the line 12 and a second input connected to a voltage reference Vr3 of, for example, 5 volts and a minimum voltage responsive operational amplifier 39 having one input connected to the line 12 and a second input connected to a reference voltage Vr4 of, for example, 5 millivolts. The outputs of all of the amplifiers 36 – 39 are applied to a logic unit 41 that in turn controls a remotely located display console 42. Also receiving the output of the fault voltage responsive amplifier 37, on a line 43 is the relay control circuit 33 shown in FIG. 2.

The supervisory current flow normally will produce a voltage drop of about 25 – 50 millivolts across the fire extinguishing network 13. However, the total drop can be raised by any increase in the resistance of the series string caused, for example, by poor contacts or an activator squib with an abnormally high resistance. Such increases in the resistance of the series activator string can interfere with proper activation of the suppressor units upon closing of the switch 16 by the activator circuit 18 and therefore is closely monitored by the supervisory network 35. An increase of series string resistance producing a total voltage drop of 100 millivolts renders activation of the series system marginal and causes the amplifier 36 to feed a warning signal to the logic unit 41 which in turn energizes a suitable warning mechanism such as a buzzer or a light in the display console 42. Maintenance personnel can then respond by examining the network 13 to locate and eliminate the source of the increased resistance. A further increase in series resistance producing a total voltage drop of about 250 millivolts will definitely render the system dysfunctional and causes the amplifier 37 to provide fault signals to both the logic unit 41 and the relay control circuit 33 shown in FIG. 2. In response to that signal the relay control circuit 33 closes the switch contacts K1 and K2 thereby switching the activator squibs 22 – 26 from a series to a parallel arrangement. Consequently, upon a subsequent closing of the switch contacts 16 by the activator circuit 18 in response to the detection of a fire by the sensor 19, a single high resistance activator squib in the series string 22 – 26 will not prevent activating current flow through the other members of the string. Accordingly, the sound squibs will be detonated to induce release of the extinguishant from their associated vessels 21. This condition is also reflected by a suitable warning at the display console 42 in response to information supplied by the logic unit 41.

The existence of a short circuit in the activator string will produce a reduction in the total voltage drop across the network 13 to below 5 millivolts and cause the amplifier 39 to produce an output signal that will be indicated by the display console 42. Conversely, the existence of an open or substantially open circuit in the activator string will produce an increase in total voltage drop to above 5 volts and cause the amplifier 38 to generate an output signal that will be indicated by the display console 42. This latter output will be applied additionally on line 44 to disable the activator circuit 18 and thereby prevent closure of the contacts in response to detection of fire by the sensor 19. This action prevents the application of a dangerous open circuit voltage in the generally quite hazardous environment in which a fire extinguishing network 13 would be located. Of course, triggering of the amplifier 38 would occur only after the fault amplifier 37 had previously switched the network 13 from a series to a parallel mode as described above.

A test circuit 46 allows the soundness of the system's electronic controls to be tested. Manual activation of the test circuit 46 produces on a line 47 a signal that simulates a fire condition to the sensor 19. Simultaneously a pair of contacts 48 are closed to complete a shunt path around the network 13. In response to the signal on the line 47, the sensor 19 energizes the activator circuit 18 which in turn closes the switch 16 for a very short period of time. The magnitude of the current pulse delivered by the activating current source 17 is detected by an operational amplifier 51 that measures the voltage drop across the resistor 15. An attenuator 52 prevents the application of an excessive voltage to the amplifier 51. The voltage applied to the amplifier 51 is compared to a reference voltage Vr5 of, for example, five volts. If the applied signal voltage exceeds the reference voltage, an output of the amplifier 51 on a line 53 is transferred to the logic circuit 41 which in turn causes the console 42 to display a proper test condition. This indicates that the systems electronics are performing their functions properly.

Obviously many modifications and variations of the present invention are possible in light of the above teachings. It is therefore to be understood that within the scope of the appended claims, the invention can be practiced otherwise than as specifically described.

What is claimed is:

1. An electrical protection system comprising:

a plurality of suppressor units activatable to suppress an abnormal condition;

a plurality of electrical current responsive activators, one associated with each of said suppressor units and adapted to induce activation thereof;

an activator current supply means;

activator control circuit means comprising series circuit means connecting said activators in series, a sensor means for said abnormal condition, and initiator means responsive to said sensor means for initiating activating current flow from said activator supply means to said series connected activators so as to induce activation of said suppressor units;

a supervisory current supply means providing through said series connected activators a constant level of supervisory current flow insufficient to induce activation of said suppressor units;

fault voltage responsive means for detecting a given abnormally high voltage level across said series connected activators; and switching circuit means for connecting said activators in parallel in response to detection of said abnormally high voltage across said series connected activators.

2. A system according to claim 1 including a maximum voltage responsive means for detecting a substantially open circuit voltage level across said series connected activators, and a disable means responsive to the detection of said open circuit voltage level for preventing the initiation of activating current flow to said series connected activators.

3. A system according to claim 1 including a minimum voltage responsive means for detecting a substantially short circuit across said series connected activators.

4. A system according to claim 3 including a maximum voltage responsive means for detecting a substantially open circuit voltage level across said series connected activators, and a disable means responsive to the detection of said open circuit voltage level for preventing the initiation of activating current flow to said series connected activators.

5. A system according to claim 4 including a danger voltage responsive means for detecting across said series connected activators an abnormally high voltage less than said given level.

6. A system according to claim 1 including test circuit means for testing the integrity of said activator control circuit means.

7. A system according to claim 6 wherein said test circuit means comprises means for causing said sensor to indicate existence of said abnormal condition and thereby initiate current flow from said activator supply means condition, shunt circuit means for shunting said series connected activators, and measuring means for measuring the current level supplied to said shunt circuit means by said activator supply means.

8. A system according to claim 7 including a maximum voltage responsive means for detecting a substantially open circuit voltage level across said series connected activators, and a disable means responsive to the detection of said open circuit voltage level for preventing the initiation of activating current flow to said series connected activators.

9. A system according to claim 8 including a minimum voltage responsive means for detecting a substantially short circuit across said series connected activators.

10. A system according to claim 9 including a danger voltage responsive means for detecting across said series connected activators an abnormally high voltage less than said given level.

11. A system according to claim 10 including logic means for receiving indicating signals from said fault, maximum, minimum and danger voltage responsive means and display means controlled by said logic means and indicating the presence of said signals.

12. An electrical protection system comprising:

a plurality of suppressor units activatable to suppress an abnormal condition;

a plurality of electrical current responsive activators, one associated with each of said suppressor units and adapted to induce activation thereof;

an activator current supply means;

activator control circuit means comprising series circuit means connecting said activators in series, a sensor means for said abnormal condition, and initiator means responsive to said sensor means for initiating activating current flow from said activator supply means to said series connected activators so as to induce activation of said suppressor units;

a supervisory current supply means providing through said series connected activators a constant level of supervisory current flow insufficient to induce activation of said suppressor units; and a maximum voltage responsive means for detecting a substantially open circuit voltage level across said series connected activators, and a disable means responsive to the detection of said open circuit voltage level for preventing the initiation of activating current flow to said series connected activators.

13. A system according to claim 12 including a minimum voltage responsive means for detecting a substantially short circuit across said series connected activators.

14. A system according to claim 12 including test circuit means for testing the integrity of said activator control circuit means.

15. A system according to claim 13 including logic means for receiving indicating signals from said maximum and minimum voltage responsive means and display means controlled by said logic means and indicating the presence of said signals.

* * * * *